US009921886B2

(12) United States Patent
Hasegawa et al.

(10) Patent No.: US 9,921,886 B2
(45) Date of Patent: Mar. 20, 2018

(54) SENSING OPERATION CONTROL METHOD AND MOBILE TERMINAL DEVICE

(71) Applicant: FUJITSU LIMITED, Kawasaki-shi, Kanagawa (JP)

(72) Inventors: Eiji Hasegawa, Kawasaki (JP); Manabu Nakao, Kunitachi (JP); Toru Kamiwada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 199 days.

(21) Appl. No.: 14/867,303

(22) Filed: Sep. 28, 2015

(65) Prior Publication Data

US 2016/0109927 A1      Apr. 21, 2016

(30) Foreign Application Priority Data

Oct. 21, 2014   (JP) .................. 2014-214638

(51) Int. Cl.
*G06F 1/32* (2006.01)
*G06F 9/50* (2006.01)

(52) U.S. Cl.
CPC .......... *G06F 9/5094* (2013.01); *G06F 1/3293* (2013.01); *Y02B 60/121* (2013.01)

(58) Field of Classification Search
CPC ...... G06F 19/28; G06F 1/3293; G06F 9/5094; Y02B 60/121
See application file for complete search history.

(56) References Cited

U.S. PATENT DOCUMENTS

| | | | | |
|---|---|---|---|---|
| 9,501,250 | B2* | 11/2016 | Nishimura | ............ G06F 3/1229 |
| 9,535,770 | B2* | 1/2017 | Ahnn | ........................ G06F 9/54 |
| 2010/0106876 | A1 | 4/2010 | Nakahashi et al. | |
| 2015/0046679 | A1* | 2/2015 | Gathala | .................... G06F 9/46 |
| | | | | 712/30 |

FOREIGN PATENT DOCUMENTS

| | | |
|---|---|---|
| JP | 2007-172322 | 7/2007 |
| JP | 2010-102540 | 5/2010 |

* cited by examiner

*Primary Examiner* — Fahmida Rahman
(74) *Attorney, Agent, or Firm* — Fujitsu Patent Center

(57) ABSTRACT

A mobile terminal device receives a request for a sensing operation from an application program, specifies candidate processors that are to perform condition determination to determine whether an event output from a sensor performing the sensing operation of the received request satisfies conditions for notification, the conditions being designated by the application program, calculates an evaluation value of electricity consumed by each of the candidate processors in the condition determination, using frequency of the event of the sensing operation of the received request in frequency data, the frequency data linking an event output from a sensor to frequency of generation of the event, and selects a candidate processor having an optimal evaluation value.

6 Claims, 13 Drawing Sheets

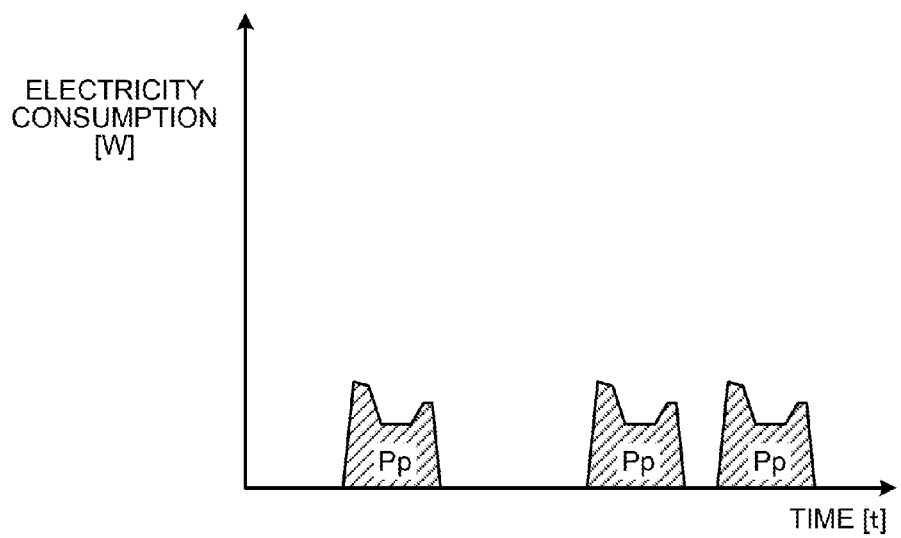

FIG.5A

| DEVICE NAME | ELECTRICITY | WAKE TIME |
|---|---|---|
| CPU | 0.3 mWh | 0.002 h |
| COPROCESSOR | 0.03 mWh | 0.0002 h |

FIG.5B

| EVENT NAME | FREQUENCY |
|---|---|
| BLE:detect | FIVE TIMES/h |
| BLE:lost | FIVE TIMES/h |
| AMBULATION:start | 30 TIMES/h |
| AMBULATION:stop | 30 TIMES/h |

FIG.5C

| PROCESSOR | EVALUATION VALUE |
|---|---|
| CPU | 22.8 |
| COPROCESSOR | 5.1 |

FIG.6A

| EVENT NAME | FREQUENCY |
|---|---|
| BLE:detect | 50 TIMES/h |
| BLE:lost | 50 TIMES/h |
| AMBULATION:start | TWO TIMES/h |
| AMBULATION:stop | TWO TIMES/h |

FIG.6B

| PROCESSOR | EVALUATION VALUE |
|---|---|
| CPU | 31.32 |
| COPROCESSOR | 33.12 |

FIG.12

| CONTENTS OF SENSING OPERATION | OPERATING DEVICE | ELECTRI-CITY | PROCESSOR TO WHICH EVENT CAN BE OUTPUT |
|---|---|---|---|
| BLE SENSING OPERATION | BLE CHIP 11a | 10 mW | CPU 14 |
| BLE SENSING OPERATION | BLE CHIP 21b2 | 12 mW | COPROCESSOR 12b |
| AMBULATION SENSING OPERATION | AMBULATION SENSOR 21b1 | 6 mW | COPROCESSOR 12b |

FIG.13

| COMBINATION OF SENSORS | PROCESSOR | ELECTRICITY EVALUATION VALUE |
|---|---|---|
| BLE CHIP 11a + AMBULATION SENSOR 21b1 | CPU 14 | 38.8 |
| BLE CHIP 11a + AMBULATION SENSOR 21b1 | COPROCESSOR 12b | 21.1 |
| BLE CHIP 21b2 + AMBULATION SENSOR 21b1 | COPROCESSOR 12b | 20.1 |

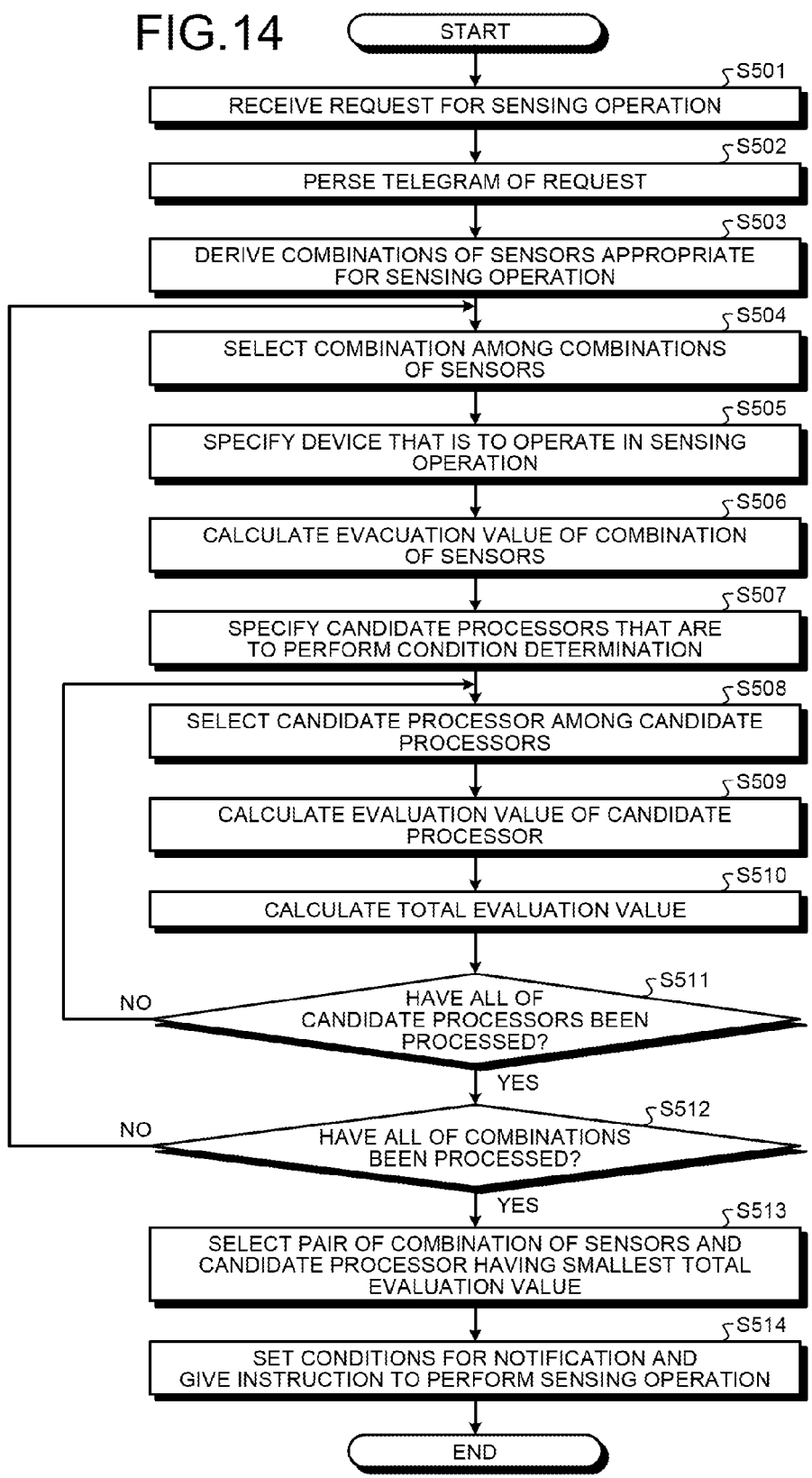

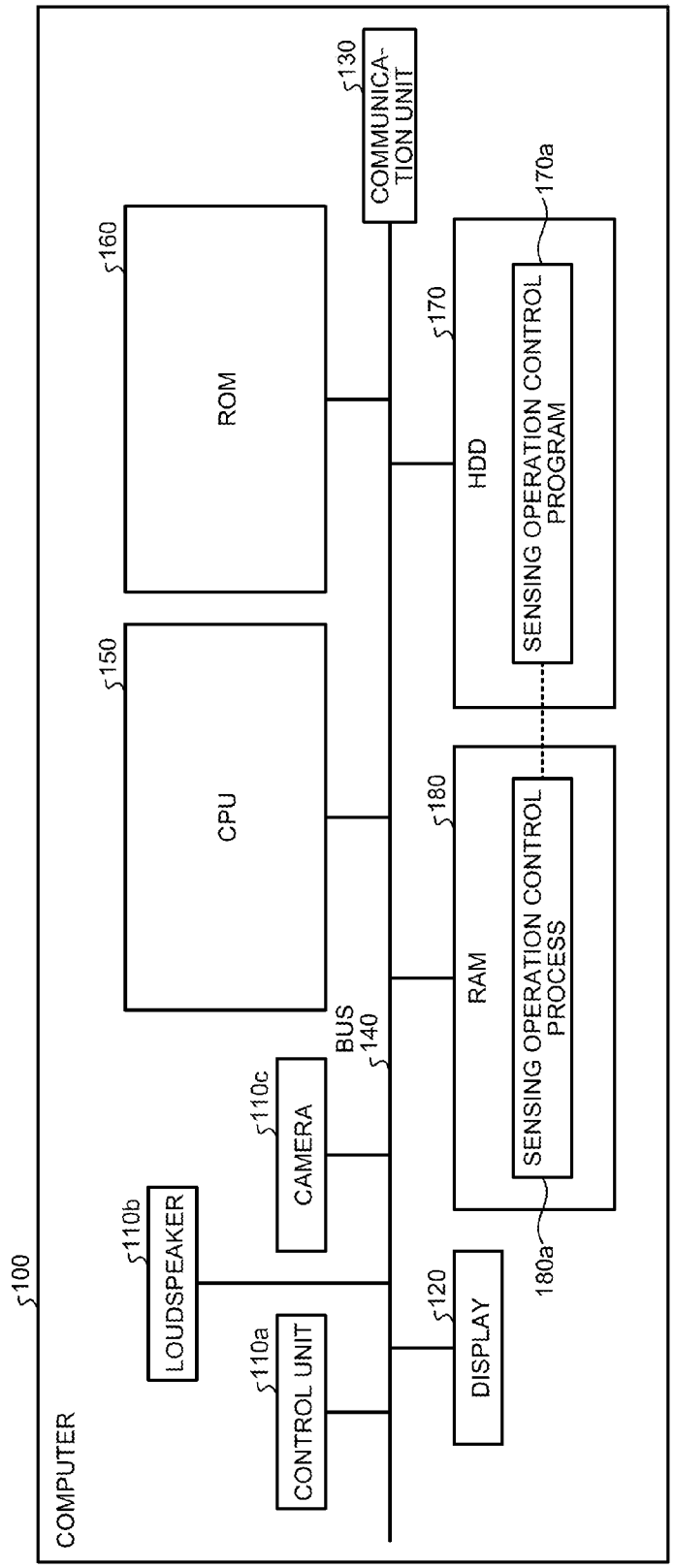

though the frequency of the application program runs on the
SENSING OPERATION CONTROL METHOD AND MOBILE TERMINAL DEVICE

CROSS-REFERENCE TO RELATED APPLICATION

This application is based upon and claims the benefit of priority of the prior Japanese Patent Application No. 2014-214638, filed on Oct. 21, 2014, the entire contents of which are incorporated herein by reference.

FIELD

The embodiments discussed herein are directed to a sensing operation control program and a mobile terminal device.

BACKGROUND

Application programs using various sensing operations are installed on mobile terminal devices typified by a smartphone. A plurality of processors is sometimes installed on such a mobile terminal device with the multi-functionalization of the mobile terminal device. Furthermore, the processors installed on the mobile terminal device are sometimes connected to the processor installed on a wearable device such as a smart glass product, or a smart watch with the developments of the wearable devices.

When the mobile terminal device performs a sensing operation in such cases, a processor sometimes performs the condition determination to determine whether the event sensed by the sensor satisfies a predetermined condition for notification. This achieves offload. In other words, only when the processor determines in the condition determination that the event satisfies the condition for notification, the notification is sent to the application program. This is aimed to reduce the time that the application program runs on the processor, and thus contribute to the reduction in electricity consumed by the mobile terminal device.

Patent Document 1: Japanese Laid-open Patent Publication No. 2007-172322
Patent Document 2: Japanese Laid-open Patent Publication No. 2010-102540

However, the above related art may be impossible to appropriately select an offload processor because the processor appropriate for offload varies depending on the environment in which the mobile terminal device is used.

SUMMARY

According to an aspect of an embodiment, a sensing operation control method comprising: receiving, by a processor, a request for a sensing operation from an application program; specifying, by the processor, candidate processors that are to perform condition determination to determine whether an event output from a sensor that performs the sensing operation of the received request satisfies conditions for notification, the conditions being designated by the application program; calculating, by the processor, an evaluation value of electricity consumed by each of the candidate processors in the condition determination, using frequency of the event of the sensing operation of the received request in frequency data, the frequency data linking an event output from a sensor to frequency of generation of the event; and selecting, by the processor, a candidate processor having an optimal evaluation value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is an explanatory diagram of an exemplary evaluation model of the electricity consumption in condition determination;
FIG. 4 is a diagram of exemplary conditions for notification;
FIG. 5A is a diagram of exemplary processor data;
FIG. 5B is a diagram of exemplary frequency data;
FIG. 5C is a diagram of exemplary calculation results of evaluation values;
FIG. 6A is a diagram of exemplary frequency data;
FIG. 6B is a diagram of exemplary calculation results of evaluation values;
FIG. 12 is a diagram of exemplary operation electricity data;
FIG. 13 is a diagram of exemplary calculation results of total evaluation values;
FIG. 14 is a flowchart of the procedures of a selection process for selecting a processor according to the second embodiment;
and
FIG. 15 is an explanatory diagram of an exemplary computer that executes a sensing operation control program according to each of the first to third embodiments.

DESCRIPTION OF EMBODIMENTS

Preferred embodiments will be explained with reference to accompanying drawings. Note that the disclosed techniques are not limited to the embodiments. Each of the embodiments can appropriately be combined without conflicting with the contents of the processes.

[a] First Embodiment

Configuration of Mobile Terminal Device

Figure 1:
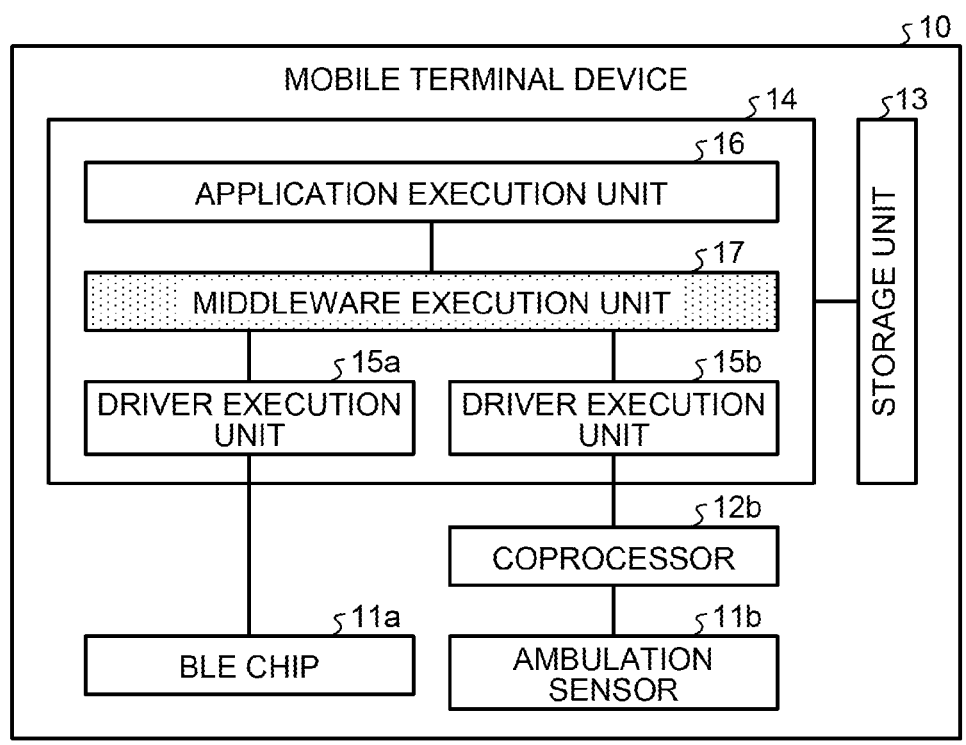
FIG. 1 is a block diagram of the functional configuration of a mobile terminal device according to a first embodiment.

First, the functional configuration of the mobile terminal device according to the present embodiment will be described. FIG. 1 is a block diagram of the functional configuration of a mobile terminal device 10 according to the first embodiment. The mobile terminal device 10 illustrated in FIG. 1 performs a sensing operation control so as to perform the sensing operation requested by an application program executed in the mobile terminal device 10 using a sensor controlled by the mobile terminal device 10.

As a part of the sensing operation control, the mobile terminal device 10 selects a processor in accordance with the frequency of operations of the processor due to an event of the sensing operation of a request in addition to the evaluation of the electricity consumption of the processor that is to perform condition determination. This enables the mobile terminal device 10 to appropriately select the processor as an offload processor. The "offload processor" herein is a processor that performs condition determination in accordance with the conditions for notification designated by the application program.

According to an embodiment, a sensing operation control program provides the sensing operation control as an Application Programming Interface (API) to the application program executed in the mobile terminal device 10. The mobile terminal device 10 can implement the sensing operation control program by installing the sensing operation control program as middleware on various computers. The sensing operation control program can be provided as package software or online software. For example, the sensing operation control program can be installed not only on a mobile communication terminal such as a smartphone, a mobile phone, or a Personal Handyphone System (PHS) but also on a mobile terminal device such as a tablet terminal or a slate terminal. Such installation enables the mobile terminal device 10 to perform the sensing operation control.

The mobile terminal device 10 is described as an exemplary device on which the sensing operation control program is installed herein. Note that, however, the sensing operation control program does not have to necessarily be installed on the mobile terminal device 10. For example, the sensing operation control program can be installed generally on information processing apparatuses including a stationary terminal device such as a personal computer.

As illustrated in FIG. 1, the mobile terminal device 10 includes a Bluetooth (a registered trademark) Low Energy (BLE) chip 11a and an ambulation sensor 11b as exemplary sensors.

The BLE chip 11a communicates with another device via BLE.

According to an aspect, the BLE chip 11a can sense a BLE compatible device. For example, when successfully detecting a BLE compatible device in the communication area of the BLE chip 11a, the BLE chip 11a outputs an event "detect" to a control unit 14. When the BLE compatible device that has successfully been detected disappears, the BLE chip 11a outputs an event "lost" to the control unit 14. Note that, although the BLE communication is described as an exemplary near field communication, the near field communication can be performed in another standard.

The ambulation sensor 11b is a sensor that collects ambulation data.

According to an aspect, a motion sensor such as a tri-axial acceleration sensor can be used as the ambulation sensor 11b. For example, using the tri-axial acceleration data collected from the motion sensor as the ambulation data, walking or fast walking can be sensed. Using a posture component obtained from a geomagnetic sensor or a gyro sensor in addition to the tri-axial acceleration data, the ambulation data can be sensed with a higher degree of accuracy. The ambulation sensor 11b can implement the sensing operation. For example, when detecting the start of walking, the ambulation sensor 11b outputs an event "start" to a coprocessor 12b. On the other hand, when detecting the stop of the walking, the ambulation sensor 11b outputs an event "stop" to the coprocessor 12b.

As for the BLE chip 11a and the ambulation sensor 11b, the BLE chip 11a can be used by a driver executed by the control unit 14 without the intermediation of another device. Differently from the BLE chip 11a, the coprocessor 12b intermediates between the ambulation sensor 11b and the driver executed by the control unit 14.

Furthermore, the mobile terminal device 10 includes the coprocessor 12b as an exemplary processor installed on the mobile terminal device 10 as illustrated in FIG. 1.

The coprocessor 12b assists the arithmetic process of the control unit 14 described below. For example, the coprocessor 12b illustrated in FIG. 1 is implemented as a microprocessor, namely, a microcomputer that controls the sensing operation by the ambulation sensor 11b.

According to an embodiment, the coprocessor 12b can perform the condition determination while controlling the ambulation sensor 11b. For example, the coprocessor 12b performs the condition determination in accordance with the conditions for notification set in the events output from the ambulation sensor 11b, the events output from the BLE chip 11a, or the combination of the events. Then, the coprocessor 12b sends the notification to the application program executed by the control unit 14 only when the conditions for notification are satisfied. This reduces the time that the application program runs in the control unit 14.

The mobile terminal device 10 further includes a storage unit 13 that works as a main storage device in the mobile terminal device 10, and the control unit 14 that works as a central processing device as illustrated in FIG. 1.

The storage unit 13 is a storage device that stores data used for the Operating System (OS), the middleware, and various programs such as an application program that are executed in the control unit 14.

According to an embodiment, the storage unit 13 is implemented as a main storage device in the mobile terminal device 10. For example, various semiconductor memory devices such as a Random Access Memory (RAM), a Read Only Memory (ROM), and a flash memory can be used as the storage unit 13. Alternatively, the storage unit 13 can be implemented as an auxiliary storage device. In such a case, a removable medium such as a Universal Serial Bus (USB) memory, or a Secure Digital (SD) card, or a Solid State Drive (SSD) can be used as the storage unit 13.

The control unit 14 includes an internal memory that stores various programs and control data so as to perform various processes using the programs and data.

According to an embodiment, the control unit 14 is implemented as a central processing device, namely, a Central Processing Unit (CPU). On the assumption that the control unit is implemented as a CPU, the control unit is sometimes referred to as a "CPU" hereinafter. Note that the control unit 14 does not have to necessarily be implemented as the central processing device, and can be implemented as a Micro Processing Unit (MPU). The control unit 14 can be implemented by a hard wired logic, for example, in an Application Specific Integrated Circuit (ASIC), or a Field Programmable Gate Array (FPGA).

The control unit 14 virtually implements processing units described below by executing various programs. For example, the control unit 14 includes a driver execution unit 15a, a driver execution unit 15b, an application execution unit 16, and a middleware execution unit 17 as illustrated in FIG. 1.

Both of the driver execution unit 15a and the driver execution unit 15b are processing units that execute the software, namely, the driver that controls the sensors controlled by the mobile terminal device 10.

Among the driver execution units, the driver execution unit 15a executes the driver for the BLE chip 11a. On the other hand, the driver execution unit 15b executes the driver for the coprocessor 12b.

The application execution unit 16 is a processing unit that executes various application programs.

According to an aspect, the application execution unit 16 can execute an arbitrary application program. The application program can be pre-installed on the mobile terminal device 10, downloaded from an external device that is wired or wirelessly connected to the mobile terminal device 10, or obtained from a removal medium. For example, the application execution unit 16 starts an application program when the instruction for the start of the application program is given by the user operation. Alternatively, the application execution unit 16 can execute an application in the background. In such a case, the application program runs in a range under the authority given by the user of the mobile terminal device 10 in compliance with the conditions prescribed, for example, by the maker of the mobile terminal device 10 or the publisher of the application program. Note that a plurality of application programs can be executed in parallel by multi-tasking.

The application program described herein sometimes sends a request for a sensing operation to the middleware executed in the middleware execution unit 17. For example, an application program for a conference system or an advertisement system sometimes connects the mobile terminal device 10 with a predetermined display device via the BLE communication when a BLE beacon placed in the display device is detected. In such an example, the application program sometimes sends, for example, a condition for notification indicating that "send a notification if a monitor is detected via BLE while the ambulation stops" together with the request for the BLE sensing operation and the ambulation sensing operation to the middleware.

The middleware execution unit 17 is a processing unit that executes a sensing operation control program provided as middleware.

Figure 2:
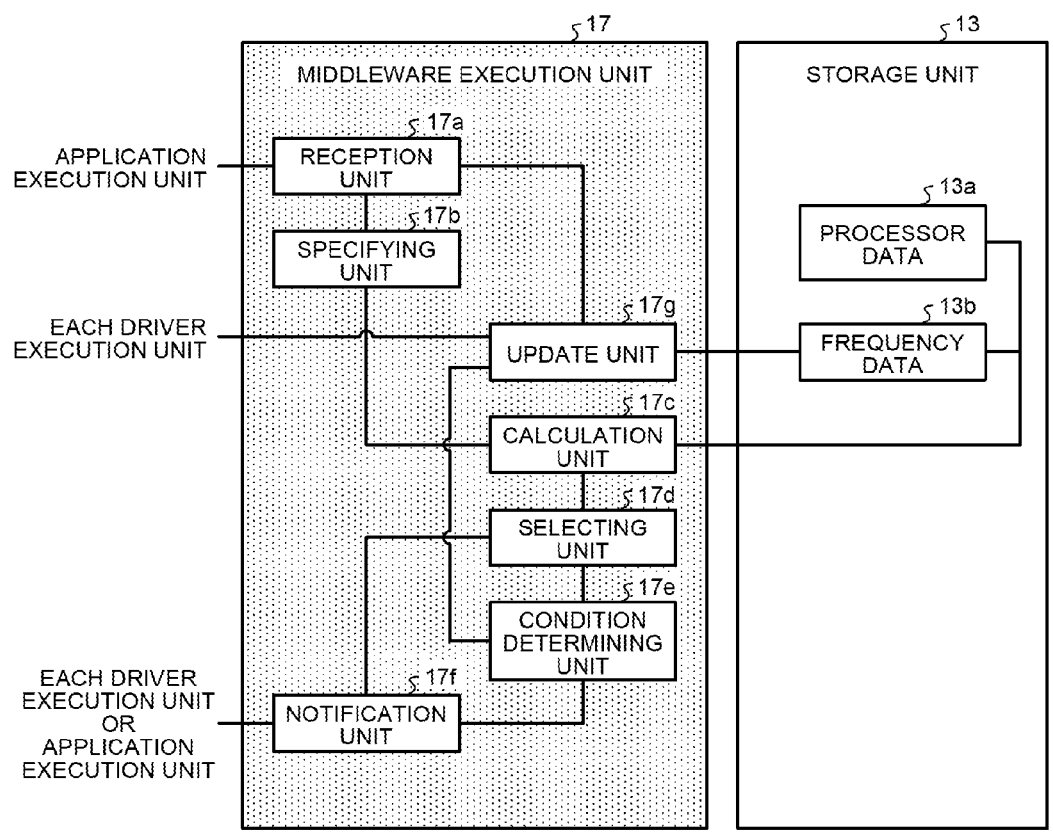
FIG. 2 is a block diagram of the functional configuration of a middleware execution unit according to the first embodiment.

FIG. 2 is a block diagram of the functional configuration of the middleware execution unit 17 according to the first embodiment. As illustrated in FIG. 2, the middleware execution unit 17 includes a reception unit 17a, a specifying unit 17b, a calculation unit 17c, a selecting unit 17d, a condition determining unit 17e, a notification unit 17f, and an update unit 17g.

The reception unit 17a is a processing unit that receives various instructions from application programs.

According to an embodiment, the reception unit 17a receives the request for a sensing operation from the application program executed by the application execution unit 16 in accordance with the API provided by the sensing operation control program. The request for the sensing operation can include, for example, the type of the sensing operation, the conditions for notification, and other types of information such as the period of time of the sensing operation. When receiving the request for the sensing operation as described above, the reception unit 17a analyzes the source code of the conditions for notification. This analysis provides each of the events used for the condition determination.

The specifying unit 17b is a processing unit that specifies a candidate processor for the offload processor that is to perform the condition determination.

According to an embodiment, when the reception unit 17a receives the request for a sensing operation from the application program executed by the application execution unit 16, the specifying unit 17b specifies the sensor that is to perform the sensing operation of the request. Subsequently, the specifying unit 17b specifies the processor to which each sensor specified as described above is to output an event. For example, when the request is for a BLE sensing operation, the CPU 14 is specified as the processor to which the BLE chip 11a is to output an event. Alternatively, when the request is for an ambulation sensing operation, the coprocessor 12b is specified as the processor to which the ambulation sensor 11b is to output an event. When a type of the processors is specified as described above, the event used for the condition determination can be obtained without the intermediation of another processor, and thus the processor to which the sensor is to output the event can be selected as the offload processor without the evaluation of electricity described below. Alternatively, when the request is for both of a BLE sensing operation and an ambulation sensing operation, the CPU 14 is specified as the processor to which the BLE chip 11a is to output the event and the coprocessor 12b is specified as the processor to which the ambulation sensor 11b is to output the event. When two types of processors are specified as described above, the event used for the condition determination is obtained with the intermediation of another processor in order to select either of the processors. In such a case, a selecting unit described below selects the offload processor by determining which of the processors consumes lower electricity.

The calculation unit 17c is a processing unit that calculates, for each of the candidate offload processors, the evaluation value of the electricity consumed by a device that is the candidate processor during the condition determination, using the frequency of output of the event from the sensor that performs the sensing operation of the request.

For example, the calculation unit 17c described herein evaluates the electricity consumption of a candidate processor on the assumption described below. For example, the processor performs the condition determination every time a sensor such as the BLE chip 11a or the ambulation sensor 11b outputs an event. Accordingly, it is assumed that the processor operates only when an event is generated. In other words, the candidate processor is powered on when receiving an event from a sensor. The candidate processor is switched to the sleep state after determining the condition of the event. In such a case, the electricity consumption is modeled as described below such that the electricity consumption can be evaluated.

FIG. 3 is an explanatory diagram of an exemplary evaluation model of the electricity consumption in condition determination. The electricity consumption (W) is shown on the vertical axis and the time (t) is shown on the horizontal axis of the graph illustrated in FIG. 3. FIG. 3 illustrates areas, which are shaded with diagonal lines from bottom left to top right, as the electricity $P_p$ (Wh) consumed by the processor per condition determination. When the processor consumes the electricity $P_p$ per condition determination as illustrated in FIG. 3, the electricity consumption is evaluated by multiplying the electricity $P_p$ by the frequency $F_s$ of generation of an event of the sensing operation used for the condition determination. In other words, the calculation unit 17c calculates the electricity consumption with the calculation expression "Pp×Fs". The expression ΣPp·Fs is calculated by summing the values found by this calculation of the events of the request. This calculates the evaluation value of the electricity consumption of a candidate processor.

More specifically, the calculation unit 17c calculates the evaluation value of each of the events of the request before finding the evaluation value ΣPp·Fs of the electricity consumption of each candidate processor. In other words, with reference to the storage unit 13, the calculation unit 17c reads a processor data 13a in which the electricity Pp that each processor consumes per condition determination is linked, for example, to the wake time of the processor, and reads a frequency data 13b in which each event is linked, for example, to the frequency Fs of generation of the event. After that, the calculation unit 17c calculates the evaluation value of the event to be calculated by multiplying the frequency Fs linked to the event to be calculated among the events in the frequency data 13b by the electricity Pp linked to the candidate processor in the electricity Pp in the processor data 13a. When the candidate processor obtains an event used for the condition determination through the other processor in such a calculation, the other processor is also activated from the sleep state in response to the generation of the event. In such a case, the calculation unit 17c calculates the evaluation value of the event to be calculated by adding the electricity Pp'·Fs consumed by the other processor to the electricity Pp·Fs consumed by the candidate processor. After that, the calculation unit 17c calculates the evaluation value ΣPp·Fs of the electricity consumption of the candidate processor by summing the evaluation values of the events.

The selecting unit 17d is a processing unit that selects an offload processor.

According to an embodiment, the selecting unit 17d selects the candidate processor having the best evaluation value of the electricity consumption after the calculation unit 17c calculates the evaluation value of the electricity consumption of each of the candidate processors. For example, the smaller the calculated evaluation value is, the more highly the value is evaluated as described above. In such a case, the selecting unit 17d selects the candidate processor having the smallest evaluation value as the offload processor among the candidate processors. After that, the selecting unit 17d sets the conditions for notification of the application program in the offload processor in accordance with the selection result. For example, when a processor other than the CPU 14 is selected, the source code of the conditions for notification received from the application program can be output to the offload processor after the driver executed, for example, by the driver execution unit 15b compiles the source code.

The condition determining unit 17e is a processing unit that performs condition determination.

According to an embodiment, the condition determining unit 17e performs condition determination in accordance with the conditions for notification set by the selecting unit 17d when the selecting unit 17d selects the CPU 14 as the offload processor. A case in which a condition for notification that indicates "send a notification if a monitor is detected via BLE while the ambulation stops" is set will be described as an example hereinafter. In the case, the condition determining unit 17e updates the value of "blestate" that indicates the state of BLE to "true" when the BLE chip 11a outputs the event "detect". On the other hand, the condition determining unit 17e updates the value of "blestate" to "false" when the BLE chip 11a outputs the event "lost". Similarly, the condition determining unit 17e updates the value of "walkstate" that indicates the state of the ambulation to "true" when the ambulation sensor 11b outputs the event "start". On the other hand, the condition determining unit 17e updates the value of "walkstate" to "false" when the ambulation sensor 11b outputs the event "stop". The condition determining unit 17e manages the transition between the states described above. Meanwhile, the condition determining unit 17e determines that the conditions for notification are satisfied when the value of "blestate" is "true" and the value of "walkstate" is "false". Needless to say, when the same conditions for notification are set, the condition determining unit 17e and the coprocessor 12b perform the same process in the condition determination.

The notification unit 17f is a processing unit that sends various notifications.

According to an aspect, the notification unit 17f notifies the condition determining unit 17e of an event when the BLE chip 11a or the ambulation sensor 11b outputs the event. The condition determining unit 17e further notifies the application program executed by the application execution unit 16 that the conditions for notification are satisfied when the condition determining unit of the condition determining unit 17e or the coprocessor 12b determines that the conditions for notification are satisfied.

The update unit 17g is a processing unit that updates the frequency data 13b.

According to an embodiment, the update unit 17g records the time to start the measurement of each event of the sensing operation in an internal memory (not illustrated) after the selecting unit 17d selects the offload processor and the sensing operation of the request starts. The update unit 17g waits for an instruction to stop the sensing operation from the application program. When receiving an instruction to stop the sensing operation from the application program, the update unit 17g records the time when the measurement of each event is completed in the internal memory. After that, the update unit 17g calculates the period of the measurement of each event by subtracting the measurement start time from the measurement completion time. Subsequently, the update unit 17g obtains the number of times of generation of an event in the measurement period prescribed with the measurement start time and the measurement completion time from the condition determining unit 17e in the CPU 14 or from another processor that performs condition determination. Subsequently, the update unit 17g cumulatively adds the measurement period measured in the present sensing operation to the measurement periods accumulated in the previous sensing operations for each event of the sensing operation. Meanwhile, the update unit 17g cumulatively adds the number of times of generation measured in the present sensing operation to the numbers of times of generation accumulated in the previous sensing operations. Subsequently, the update unit 17g calculates the frequency of generation of each event, for example, the number of times/h by dividing the cumulative value of the numbers of times of generation to which the number of times of generation measured in the present sensing operation is cumulatively added by the cumulative value of the measurement periods to which the measurement period measured in the present sensing operation is cumulatively added. Subsequently, the update unit 17g updates the previous frequency by writing the calculated frequency of generation of the event over the previous frequency in the frequency data 13b stored in the storage unit 13. In the manner as described above, the actual measured values of the frequency of generation of an event can be collected as the frequency data 13b.

The case in which the update unit 17g sets the actual measured values of the frequency in the frequency data 13b is described as an example herein. Note that, however, the set values are not necessarily the actual measured values. A default value can be registered instead of the actual values, for example, when the frequency of the event is not measured.

Note that the mobile terminal device 10 can further include various functional units included in a known computer in addition to the functional units illustrated in FIG. 1. For example, when the mobile terminal device 10 is implemented as a tablet terminal or a slate terminal, the mobile terminal device 10 can further include an input device, and a display device, or a device that can input and display the information. When the mobile terminal device 10 is implemented as a mobile communication terminal, the mobile terminal device 10 can further include functional units such as an antenna, a wireless communication unit connected to the mobile communication network, and a Global Positioning System (GPS) receiver.

Specific Example

A specific example of the sensing operation control according to the present embodiment will be described next with reference to FIGS. 4 to 5C. FIG. 4 is a diagram of exemplary conditions for notification. FIG. 5A is a diagram of exemplary processor data 13a. FIG. 5B is a diagram of exemplary frequency data 13b. FIG. 5C is a diagram of exemplary calculation results of the evaluation values. Note that the frequency data 13b illustrated in FIG. 5B is the frequency that the update unit 17g updates per event when a user A uses the mobile terminal device 10. The calculation results of the evaluation values illustrated in FIG. 5C are calculated with the frequency data 13b illustrated in FIG. 5B.

It is assumed as an example herein that the source code of the conditions for notification illustrated at the upper part of FIG. 4 is received together with a request for a sensing operation from the application program. For example, the if statement on the first line in FIG. 4 defines that the value of "blestate" that indicates the state of the BLE is set to "true" when the BLE sensor outputs the event "detect". Furthermore, the if statement on the second line in FIG. 4 defines that the value of "blestate" is set to "false" when the BLE sensor outputs the event "lost". Furthermore, the if statement on the third line in FIG. 4 defines that the value of "walkstate" that indicates the state of the ambulation is set to "true" when the ambulation sensor outputs the event "start". Furthermore, the if statement on the fourth line in FIG. 4 defines that the value of "walkstate" that indicates the state of the ambulation is set to "false" when the ambulation sensor outputs the event "stop". Furthermore, the if statement on the fifth line in FIG. 4 defines that a notification is sent to the application program when the value of "blestate" is "true" and the value of "walkstate" is not "true".

When the conditions for notification described above are parsed, it can be determined that the events used for the condition determination are four events: "detect" for the BLE, "lost" for the BLE, "start" for the ambulation, and "stop" for the ambulation, as described at the lower part of FIG. 4.

When the request is for both of a BLE sensing operation and an ambulation sensing operation, the CPU 14 is specified as the destination to which the BLE chip 11a outputs the event and the coprocessor 12b is specified as the destination to which the ambulation sensor 11b outputs the event. Accordingly, the CPU 14 and the coprocessor 12b are specified as the candidate processors for the offload processor.

(A1) The Evaluation Value when the CPU 14 Performs Condition Determination (the User A)

When the candidate processor is the CPU 14, the evaluation value of each event is calculated as described below.

For example, when the event is "detect", the CPU 14 can receive the output from the BLE chip 11a without the intermediation of another processor. In this case, the product of the electricity Pp (=0.3 mWh) of the CPU 14 in the processor data 13a illustrated in FIG. 5A and the frequency Fs (=five times/h) of the event "detect" in the frequency data 13b illustrated in FIG. 5B, namely, the calculation result "1.5" from Pp×Fs is calculated as the evaluation value of the event "detect".

When the event is "lost", the CPU 14 can also receive the output from the BLE chip 11a without the intermediation of another processor. In this case, the product of the electricity Pp (=0.3 mWh) of the CPU 14 in the processor data 13a illustrated in FIG. 5A and the frequency Fs (=five times/h) of the event "lost" in the frequency data 13b illustrated in FIG. 5B, namely, the calculation result "1.5" from Pp×Fs is calculated as the evaluation value of the event "lost".

On the other hand, when the event is "start", the CPU 14 receives the output from the ambulation sensor 11b through the coprocessor 12b. In this case, the product of the electricity Pp (=0.3 mWh) of the CPU 14 in the processor data 13a illustrated in FIG. 5A and the frequency Fs (=30 times/h) of the event "start" in the frequency data 13b illustrated in FIG. 5B, namely, the calculation result "9=0.3× 30" from Pp·Fs is calculated. Furthermore, the product of the electricity Pp' (=0.03 mWh) of the coprocessor 12b and the frequency Fs (=30 times/h) of the event "start" in the frequency data 13b illustrated in FIG. 5B, namely, the calculation result "0.9=0.03×30" from Pp'·Fs is calculated. After that, the sum "9.9" of Pp·Fs and Pp'·Fs is calculated as the evaluation value of the event "start".

Similarly, when the event is "stop", the CPU 14 also receives the output from the ambulation sensor 11b through the coprocessor 12b. In this case, the product of the electricity Pp (=0.3 mWh) of the CPU 14 in the processor data 13a illustrated in FIG. 5A and the frequency Fs (=30 times/h) of the event "stop" in the frequency data 13b illustrated in FIG. 5B, namely, the calculation result "9=0.3× 30" from Pp·Fs is calculated. Furthermore, the product of the electricity Pp' (=0.03 mWh) of the coprocessor 12b and the frequency Fs (=30 times/h) of the event "stop" in the frequency data 13b illustrated in FIG. 5B, namely, the calculation result "0.9=0.03×30" from Pp'·Fs is calculated. After that, the sum "9.9" of Pp·Fs and Pp'·Fs is calculated as the evaluation value of the event "stop".

The sum of the evaluation values of the events calculated as described above is calculated as the evaluation value of the electricity consumption of the candidate processor "CPU 14" used by the user A. In other words, as illustrated in FIG. 5C, the evaluation value "22.8" of the electricity consumption of the candidate processor "CPU 14" is calculated by summing the evaluation value "1.5" of the event "detect", the evaluation value "1.5" of the event "lost", the evaluation value "9.9" of the event "start", and the evaluation value "9.9" of the event "stop".

(A2) The Evaluation Value when the Coprocessor 12b Performs Condition Determination (the User A)

When the candidate processor is the coprocessor 12b, the evaluation value of each event is calculated as described below.

For example, when the event is "detect", the coprocessor 12b receives the output from BLE chip 11a through the CPU 14. In this case, the product of the electricity Pp (=0.03 mWh) of the coprocessor 12b in the processor data 13a illustrated in FIG. 5A and the frequency Fs (=five times/h) of the event "detect" in the frequency data 13b illustrated in FIG. 5B, namely, the calculation result "0.15=0.03×5" from Pp·Fs is calculated. Furthermore, the product of the electricity Pp' (=0.3 mWh) of the CPU 14 in the processor data 13a illustrated in FIG. 5A and the frequency Fs (=five times/h) of the event "detect" in the frequency data 13b illustrated in FIG. 5B, namely, the calculation result "1.5=0.3×5" from Pp'·Fs is calculated. After that, the sum "1.65" of Pp·Fs and Pp'·Fs is calculated as the evaluation value of the event "detect".

When the event is "lost", the coprocessor 12b also receives the output from BLE chip 11a through the CPU 14. In this case, the product of the electricity Pp (=0.03 mWh) of the coprocessor 12b in the processor data 13a illustrated in FIG. 5A and the frequency Fs (=five times/h) of the event "lost" in the frequency data 13b illustrated in FIG. 5B, namely, the calculation result "0.15=0.03×5" from Pp·Fs is calculated. Furthermore, the product of the electricity Pp' (=0.3 mWh) of the CPU 14 in the processor data 13a illustrated in FIG. 5A and the frequency Fs (=five times/h) of the event "lost" in the frequency data 13b illustrated in FIG. 5B, namely, the calculation result "1.5=0.3×5" from Pp'·Fs is calculated. After that, the sum "1.65" of Pp·Fs and Pp'·Fs is calculated as the evaluation value of the event "lost".

On the other hand, when the event is "start", the coprocessor 12b can receive the output from the ambulation sensor 11b without the intermediation of another processor. In this case, the product of the electricity Pp (=0.03 mWh) of the coprocessor 12b and the frequency Fs (=30 times/h) of the event "start" in the frequency data 13b illustrated in FIG. 5B, namely, the calculation result "0.9=0.03×30" from Pp·Fs is calculated as the evaluation value of the event "start".

Similarly, when the event is "stop", the coprocessor 12b can receive the output from the ambulation sensor 11b without the intermediation of another processor. In this case, the product of the electricity Pp (=0.03 mWh) of the coprocessor 12b and the frequency Fs (=30 times/h) of the event "stop" in the frequency data 13b illustrated in FIG. 5B, namely, the calculation result "0.9=0.03×30" from Pp·Fs is calculated as the evaluation value of the event "stop".

The sum of the evaluation values of the events calculated as described above is calculated as the evaluation value of the electricity consumption of the candidate processor "coprocessor 12b" used by the user A. In other words, as illustrated in FIG. 5C, the evaluation value "5.1" of the electricity consumption of the candidate processor "coprocessor 12b" is calculated by summing the evaluation value "1.65" of the event "detect", the evaluation value "1.65" of the event "lost", the evaluation value "0.9" of the event "start", and the evaluation value "0.9" of the event "stop".

(A3) The Result of the Selection of the Offload Processor (the User A)

When the evaluation value of the electricity consumption of each candidate processor used by the user A is calculated as described above, the candidate processor "coprocessor 12b" having the smallest evaluation value, namely, "5.1" is selected as the offload processor among the candidate processors. When the offload processor is a processor other than the CPU 14 as described above, the conditions for notification illustrated at the upper part of FIG. 4 can be set in the coprocessor 12b after being converted, for example, into a byte code "40 00 21 ad 32 e2 . . . ".

(B1) The Evaluation Value when the CPU 14 Performs Condition Determination (the User B)

FIG. 6A is a diagram of exemplary frequency data 13b. FIG. 6B is a diagram of exemplary calculation results of the evaluation values. Note that the frequency data 13b illustrated in FIG. 6A is the frequency that the update unit 17g updates per event when a user B uses the mobile terminal device 10. The calculation results of the evaluation values illustrated in FIG. 6B are calculated with the frequency data 13b illustrated in FIG. 6A.

When the candidate processor is the CPU 14, the evaluation value of each event is calculated as described below.

For example, when the event is "detect", the CPU 14 can receive the output from the BLE chip 11a without the intermediation of another processor. In this case, the product of the electricity Pp (=0.3 mWh) of the CPU 14 in the processor data 13a illustrated in FIG. 5A and the frequency Fs (=50 times/h) of the event "detect" in the frequency data 13b illustrated in FIG. 6A, namely, the calculation result "15" from Pp×Fs is calculated as the evaluation value of the event "detect".

Similarly, when the event is "lost", the CPU 14 can receive the output from the BLE chip 11a without the intermediation of another processor. In this case, the product of the electricity Pp (=0.3 mWh) of the CPU 14 in the processor data 13a illustrated in FIG. 5A and the frequency Fs (=50 times/h) of the event "lost" in the frequency data 13b illustrated in FIG. 6A, namely, the calculation result "15" from Pp×Fs is calculated as the evaluation value of the event "lost".

On the other hand, when the event is "start", the CPU 14 receives the output from the ambulation sensor 11b through the coprocessor 12b. In this case, the product of the electricity Pp (=0.3 mWh) of the CPU 14 in the processor data 13a illustrated in FIG. 5A and the frequency Fs (=two times/h) of the event "start" in the frequency data 13b illustrated in FIG. 6A, namely, the calculation result "0.6=0.3×2" from Pp·Fs is calculated. Furthermore, the product of the electricity Pp' (=0.03 mWh) of the coprocessor 12b and the frequency Fs (=two times/h) of the event "start" in the frequency data 13b illustrated in FIG. 6A, namely, the calculation result "0.06=0.03×2" from Pp'·Fs is calculated. After that, the sum "0.66" of Pp·Fs and Pp'·Fs is calculated as the evaluation value of the event "start".

Similarly, when the event is "stop", the CPU 14 receives the output from the ambulation sensor 11b through the coprocessor 12b. In this case, the product of the electricity Pp (=0.3 mWh) of the CPU 14 in the processor data 13a illustrated in FIG. 5A and the frequency Fs (=two times/h) of the event "stop" in the frequency data 13b illustrated in FIG. 6A, namely, the calculation result "0.6=0.3×2" from Pp·Fs is calculated. Furthermore, the product of the electricity Pp' (=0.03 mWh) of the coprocessor 12b and the frequency Fs (=two times/h) of the event "stop" in the frequency data 13b illustrated in FIG. 6A, namely, the calculation result "0.06=0.03×2" from Pp'·Fs is calculated. After that, the sum "0.66" of Pp·Fs and Pp'·Fs is calculated as the evaluation value of the event "stop".

As described above, the sum of the evaluation values of the events is calculated as the evaluation value of the electricity consumption of the candidate processor "CPU 14" used by the user B. In other words, as illustrated in FIG. 6B, the evaluation value "31.32" of the electricity consumption of the candidate processor "CPU 14" is calculated by summing the evaluation value "15" of the event "detect", the evaluation value "15" of the event "lost", the evaluation value "0.66" of the event "start", and the evaluation value "0.66" of the event "stop".

(B2) The Evaluation Value when the Coprocessor 12b Performs Condition Determination (the User B)

When the candidate processor is the coprocessor 12b, the evaluation value of each event is calculated as described below.

For example, when the event is "detect", the coprocessor 12b receives the output from BLE chip 11a through the CPU 14. In this case, the product of the electricity Pp (=0.03 mWh) of the coprocessor 12b in the processor data 13a illustrated in FIG. 5A and the frequency Fs (=50 times/h) of the event "detect" in the frequency data 13b illustrated in FIG. 6A, namely, the calculation result "1.5=0.03×50" from Pp·Fs is calculated. Furthermore, the product of the electricity Pp' (=0.3 mWh) of the CPU 14 in the processor data 13a illustrated in FIG. 5A and the frequency Fs (=50 times/h) of the event "detect" in the frequency data 13b illustrated in FIG. 6A, namely, the calculation result "15=0.3×50" from Pp·Fs is calculated. After that, the sum "16.5" of Pp·Fs and Pp'·Fs is calculated as the electricity consumption of the event "detect".

Similarly, when the event is "lost", the coprocessor 12b also receives the output from BLE chip 11a through the CPU 14. In this case, the product of the electricity Pp (=0.03 mWh) of the coprocessor 12b in the processor data 13a illustrated in FIG. 5A and the frequency Fs (=50 times/h) of the event "lost" in the frequency data 13b illustrated in FIG. 6A, namely, the calculation result "1.5=0.03×50" from Pp·Fs is calculated. Furthermore, the product of the electricity Pp' (=0.3 mWh) of the CPU 14 in the processor data 13a illustrated in FIG. 5A and the frequency Fs (=50 times/h) of the event "lost" in the frequency data 13b illustrated in FIG. 6A, namely, the calculation result "15=0.3×50" from Pp'·Fs is calculated. After that, the sum "16.5" of Pp·Fs and Pp'·Fs is calculated as the evaluation value of the event "lost".

On the other hand, when the event is "start", the coprocessor 12b can receive the output from the ambulation sensor 11b without the intermediation of another processor. In this case, the product of the electricity Pp (=0.03 mWh) of the coprocessor 12b and the frequency Fs (=two times/h) of the event "start" in the frequency data 13b illustrated in FIG. 6A, namely, the calculation result "0.06=0.03×2" from Pp·Fs is calculated as the evaluation value of the event "start".

Similarly, when the event is "stop", the coprocessor 12b can receive the output from the ambulation sensor 11b without the intermediation of another processor. In this case, the product of the electricity Pp (=0.03 mWh) of the coprocessor 12b and the frequency Fs (=two times/h) of the event "stop" in the frequency data 13b illustrated in FIG. 6A, namely, the calculation result "0.06=0.03×2" from Pp·Fs is calculated as the evaluation value of the event "stop".

As described above, the sum of the evaluation values of the events is calculated as the evaluation value of the electricity consumption of the candidate processor "coprocessor 12b" used by the user B. In other words, as illustrated in FIG. 5C, the evaluation value "33.12" of the electricity consumption of the candidate processor "coprocessor 12b" is calculated by summing the evaluation value "16.5" of the event "detect", the evaluation value "16.5" of the event "lost", the evaluation value "0.06" of the event "start", and the evaluation value "0.06" of the event "stop".

(B3) The Result of the Selection of the Offload Processor (the User B)

When the evaluation value of the electricity consumption of each candidate processor used by the user B is calculated as described above, the candidate processor "CPU 14" having the smallest evaluation value, namely, "31.32" is selected as the offload processor among the candidate processors.

(AB4) Conclusion

As described above, the processor selected as the offload processor varies depending on the user of the mobile terminal device 10. As described above, if the mobile terminal device is used in various environments, the processor that can perform the condition determination with the lowest consumption of electricity can be selected as the offload processor. Thus, the mobile terminal device 10 according to the present embodiment can appropriately select the offload processor.

Flow of Process

The flow of the process in the mobile terminal device 10 according to the present embodiment will be described next. Note that (1) a process that the mobile terminal device 10 selects the processor will be described first and (2) a process that the mobile terminal device 10 updates the frequency data 13b will be described next.

(1) A Process for Selecting the Processor

Figure 7:
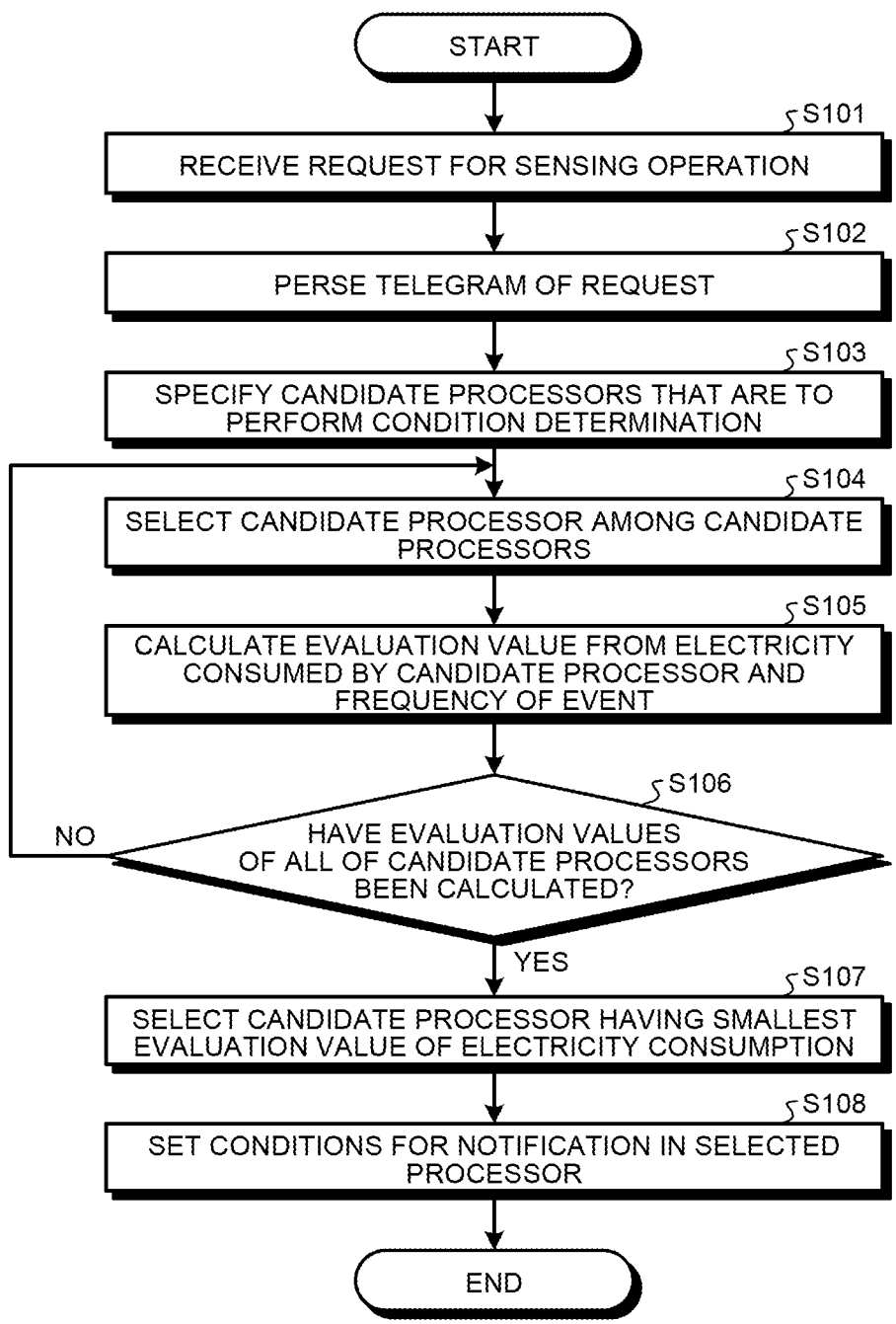
FIG. 7 is a flowchart of the procedures of a selection process for selecting a processor according to the first embodiment.

FIG. 7 is a flowchart of the process for selecting the processor according to the first embodiment. For example, the mobile terminal device 10 performs the process when receiving a request for a sensing operation from the application program that the application execution unit 16 executes.

As illustrated in FIG. 7, when receiving a request for a sensing operation from the application program (step S101), the reception unit 17a analyzes the source code of the conditions for notification that the reception unit 17a receives together with the request in step S101 (step S102).

Subsequently, the specifying unit 17b specifies the candidate processors for the offload processor among the processors to which the sensors that each performs the sensing operation of the request received in step S101 outputs the event (step S103).

After that, the calculation unit 17c selects a candidate processor from the candidate processors specified in step S103 (step S104). Subsequently, the calculation unit 17c calculates the evaluation value of the electricity that the candidate processor selected in step S104 consumes during the condition determination, using the frequency of generation of each event analyzed from the conditions for notification in step S102 (step S105).

The procedures in steps S104 and S105 are repeated until the evaluation values of the electricity consumption of all of the candidate processors specified in step S103 are calculated (step S106: No).

After the evaluation value of the electricity consumption of each of the candidate processors specified in step S103 is calculated (step S106: Yes), the selecting unit 17d selects the candidate processor having the smallest evaluation value as the offload processor among the candidate processors (step S107). After that the selecting unit 17d sets the conditions for notification of the application program in the offload processor selected in step S107 (step S108). Then, the process is completed.

After the process, the sensor performs the sensing operation of the request from the application program, and the condition determination with the events is performed.

(2) A Process for Updating the Frequency Data

Figure 8:
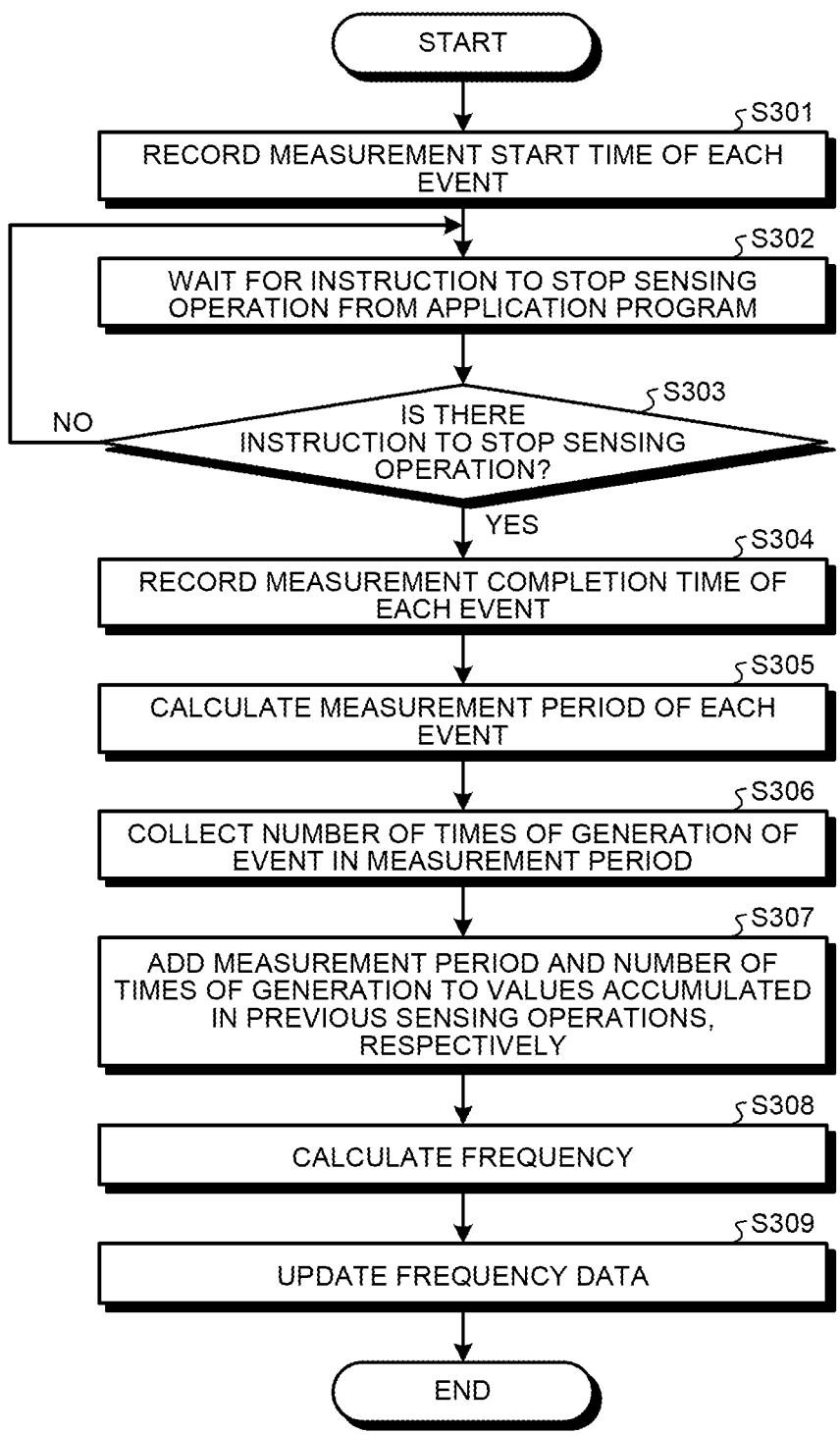
FIG. 8 is a flowchart of the procedures of an updating process for updating the frequency data according to the first embodiment.

FIG. 8 is a flowchart of the process for updating the frequency data according to the first embodiment. For example, the process is performed when the sensing operation of the request is performed after the selecting unit 17*d* selects the offload processor.

As illustrated in FIG. 8, the update unit 17*g* records the measurement start time of each event of the sensing operation received in step S101 in the internal memory (step S301). Then, the update unit 17*g* waits for the instruction to stop the sensing operation from the application program (step S302). Note that the update unit 17*g* waits for the instruction to stop the sensing operation while the process goes back to step S302 until the update unit 17*g* receives the instruction to stop the sensing operation from the application program (step S303: No).

After that, when the update unit 17*g* receives the instruction to stop the sensing operation from the application program (step S303: Yes), the update unit 17*g* records the measurement completion time of each event of the sensing operation in the internal memory (step S304).

After that, the update unit 17*g* calculates the measurement period of each event by subtracting the measurement start time from the measurement completion time (step S305). Then, the update unit 17*g* collects the number of times of generation of each event in the measurement period prescribed by the measurement completion time and the measurement start time from the condition determining unit 17*e* in the CPU 14 or another processor performing the condition determination (step S306).

Subsequently, the update unit 17*g* cumulatively adds the measurement period measured in the present sensing operation to the measurement periods accumulated in the previous sensing operations for each event of the performed sensing operation, and cumulatively adds the number of times of generation measured in the present sensing operation to the numbers of times of generation accumulated in the previous sensing operations (step S307).

Then, the update unit 17*g* calculates the frequency of each event by dividing the cumulative value of the numbers of times of generation including the number of times of generation measured in the present sensing operation by the cumulative value of the measurement periods including the measurement period measured in the present sensing operation (step S308). After that, the update unit 17*g* updates the frequency of the event of which values are calculated by writing the frequency of the event of which values are calculated in step S308 over the frequency of the event in the frequency data 13*b* stored in the storage unit 13 (step S309). Then, the process is completed.

The process is completed after the frequency is calculated in the flowchart illustrated in FIG. 8. Note that, however, the mobile terminal device 10 can generate the frequency data by adding and recording a measurement period and the number of times of generation of each event every time the updating process in FIG. 8 is performed. Then, the calculation unit 17*c* can calculate the frequency from the measurement period and the number of times of generation of each event with reference to the generated frequency data when the evaluation value of the electricity consumption is calculated.

Aspect of Effect

As described above, the mobile terminal device 10 according to the present embodiment selects the processor in accordance with the frequency of operation of the processor due to an event of the sensing operation of the request in addition to the evaluation of the electricity consumption of the processor performing the condition determination. Thus, the mobile terminal device 10 according to the present embodiment can appropriately select, for example, the offload processor.

[b] Second Embodiment

An example in which the values of the electricity consumption of the candidate processors for the offload processor are evaluated in the first embodiment is described. However, the devices to be evaluated are not limited to the candidate processors for the offload processor. Thus, an example in which the electricity consumption of the sensor that performs the sensing operation of the request from the application program is further evaluated will be described in the present embodiment.

Configuration of Mobile Terminal Device 20

Figure 9:
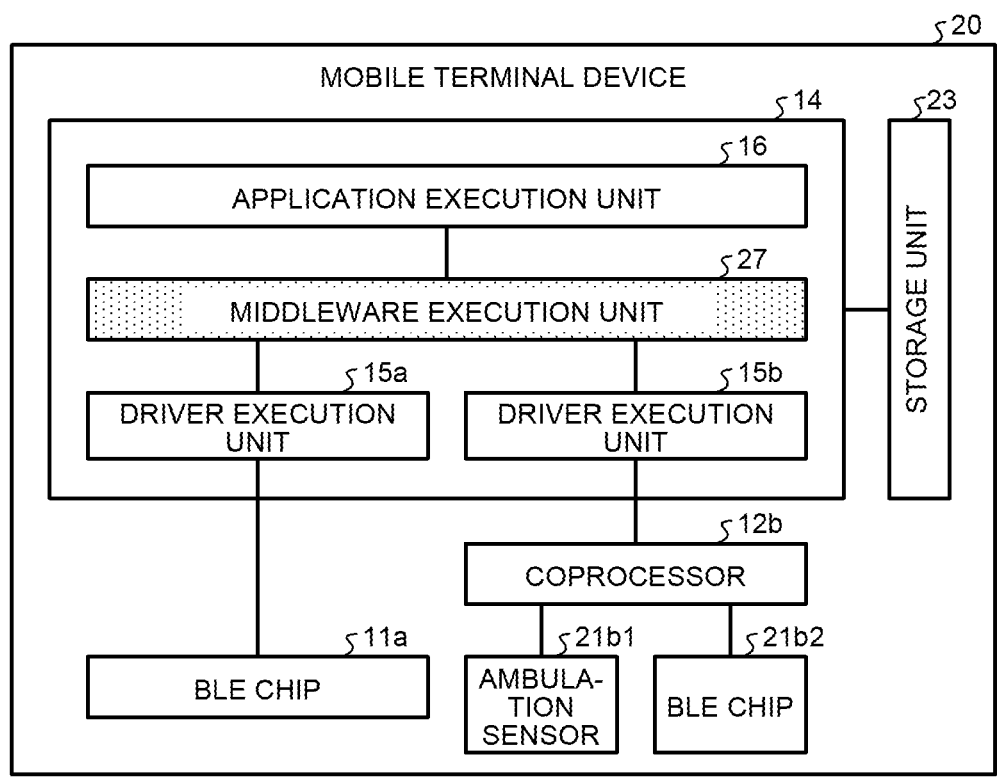
FIG. 9 is a block diagram of the functional configuration of a mobile terminal device according to a second embodiment.

FIG. 9 is a block diagram of the functional configuration of a mobile terminal device 20 according to the second embodiment. Differently from the mobile terminal device 10 illustrated in FIG. 1, the mobile terminal device 20 illustrated in FIG. 9 includes two sensors, an ambulation sensor 21*b*1 and a BLE Chip 21*b*2, that are controlled by a coprocessor 12*b*. Furthermore, the contents of the data that a storage unit 23 stores are different from the first embodiment. The contents of the process that a middleware execution unit 27 performs are different from the first embodiment. Note that the function units exerting the same functions as the function units illustrated in FIG. 1 will be put with the same reference signs and the descriptions will be omitted.

When the BLE Chip 21*b*2 is controlled by the coprocessor 12*b* as described above, there is a plurality of BLE sensors that can perform the same sensing operation in the mobile terminal device 20. The mobile terminal device 20 according to the present embodiment is also aimed to reduce the electricity consumed in a sensing operation by selecting a sensor with a lower consumption of electricity than the other sensors used to perform the sensing operation.

Figure 10:
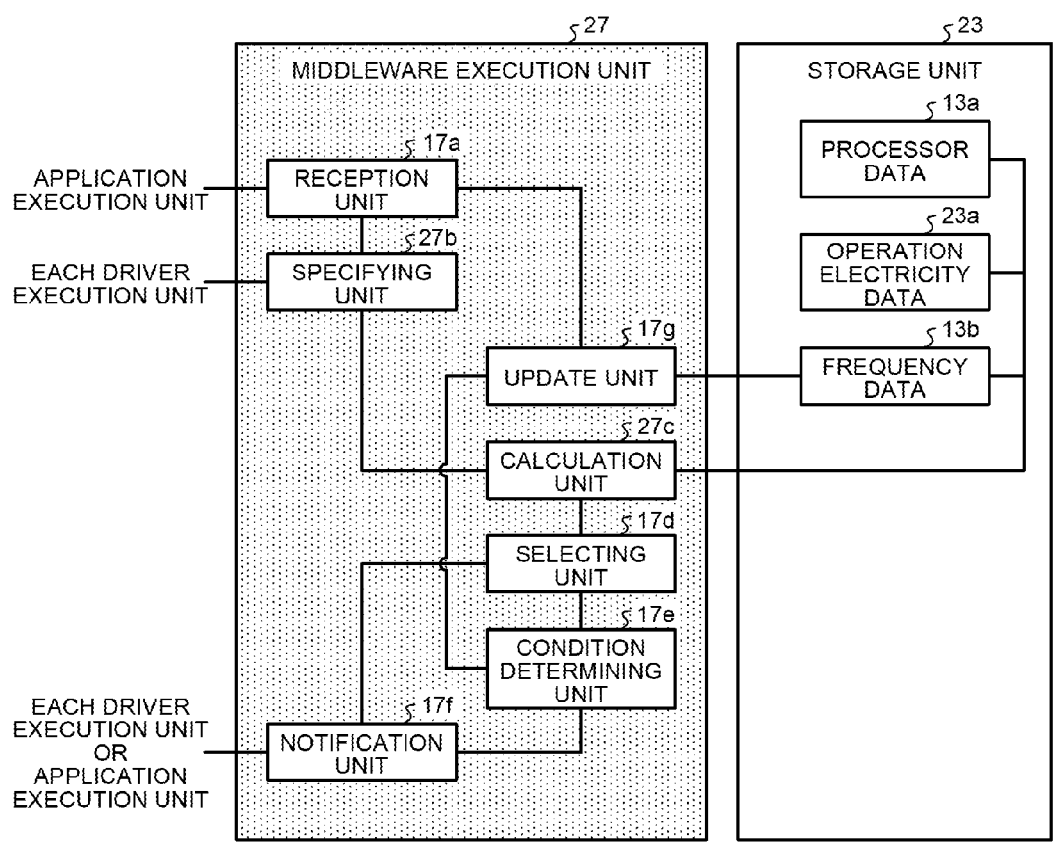
FIG. 10 is a block diagram of the functional configuration of a middleware execution unit according to the second embodiment.

FIG. 10 is a block diagram of the functional configuration of the middleware execution unit 27 according to the second embodiment. The contents of the processes performed by a specifying unit 27*b* and a calculation unit 27*c* in the middleware execution unit 27 illustrated in FIG. 10 are different from those in the middleware execution unit 17 illustrated in FIG. 2.

Similarly to the specifying unit 17*b* illustrated in FIG. 2, the specifying unit 27*b* specifies the candidate processor for the offload processor. Differently from the specifying unit 17*b*, the specifying unit 27*b* further specifies a device that performs one or more sensing operations of a request received from an application program among the sensors, drivers, or the combination of the sensors or drivers used to perform the sensing operation.

According to an embodiment, when receiving a request for the sensing operation from the application program that the application execution unit 16 executes, the specifying unit 27*b* derives the combination of the sensors that performs the sensing operation of the request. For example, the specifying unit 27*b* derives the combination of the sensors by inquiring of the driver execution units 15*a* and 15*b* which are being executed in the control unit 14, whether the combination of the sensors can perform the sensing operation of the request that the reception unit 17*a* receives.

Alternatively, the specifying unit 27b can derive the combination of the sensors by referring to the corresponding relationship table in which the corresponding relationship between the types of the sensing operations and the combinations of the sensors are prescribed and searching the combination of the sensors linked to the type of the sensing operation of the request. As described above, the specifying unit 27b can derive the combination of the sensors by either of the inquiry and the search. If there is a plurality of combinations of the sensors that perform the sensing operation of the request, the specifying unit 27b derives all of the combinations of the sensors. An example in which the combinations of the sensors are extracted is described. Note that, however, combinations of drivers can also be derived.

After that, the specifying unit 27b selects a combination of sensors among the combinations of the sensors. Subsequently, the specifying unit 27b specifies a device that is to operate in the sensing operation in the selected combination of sensors. The device that operates in the sensing operation is sometimes referred to as a "sensing operation device" hereinafter. If the middleware execution unit 27 performs the inquiry and the sensing operation can be performed, the reply can include the sensing operation device together with the fact that the sensing operation can be performed. Alternatively, if the middleware execution unit 27 performs the search, the sensing operation devices can be linked as an item of the corresponding relationship table.

Similarly to the specifying unit 17b illustrated in FIG. 2, the calculation unit 27c calculates the evaluation value of the electricity consumed each of the devices that are the candidate processors for the offload processor in the condition determination. Differently from the specifying unit 17b illustrated in FIG. 2, the calculation unit 27c further calculates the electricity consumed by each sensing operation in a combination of sensors or drivers during the sensing operation.

According to an embodiment, the calculation unit 27c calculates the electricity consumed by each device during the sensing operation as an evaluation value with reference to operation electricity data 23a stored in the storage unit 23 every time the specifying unit 27b specifies a sensing operation device. For example, the data that links items such as devices and the operation electricity can be used as the operation electricity data 23a. The calculation unit 27c searches the operation electricity data 23a for the operation electricity of each of the devices that operates in the sensing operation. After that, the calculation unit 27c calculates the evaluation value of the electricity consumption of each device during the sensing operation by summing the operation electricity of the devices.

Figure 11:
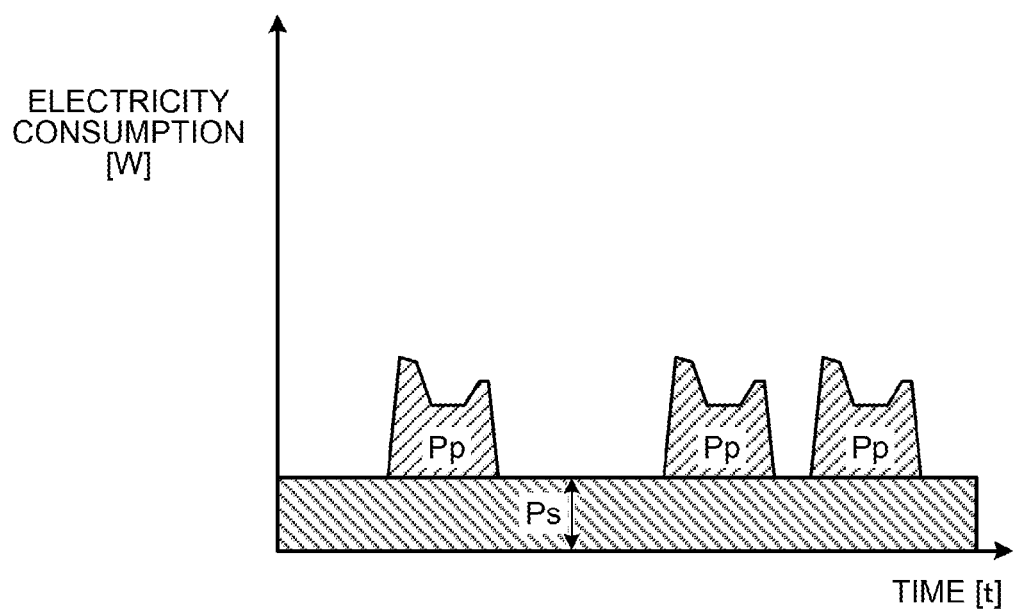
FIG. 11 is an explanatory diagram of an exemplary evaluation model of the electricity consumption in a sensing operation and condition determination.

When the electricity consumption of each of the sensing operation devices is calculated, the calculation unit 27c evaluates the electricity consumed in the sensing operation and the condition determination in accordance with the evaluation model illustrated in FIG. 11. FIG. 11 is an explanatory diagram of an exemplary evaluation model for the electricity consumption in the sensing operation and the condition determination. The electricity consumption (W) is shown on the vertical axis and the time (t) is shown on the horizontal axis illustrated in FIG. 11. FIG. 11 illustrates an area, which is shaded with diagonal lines from top left to bottom right, as the electricity Ps (W) consumed by the sensing operation device and areas, which are shaded with diagonal lines from bottom left to top right, as the electricity Pp (Wh) consumed by the processor per condition determination. The sensing operation device is constantly powered on as illustrated in FIG. 11. Thus, the electricity consumed in the sensing operation in addition to the electricity consumed in the condition determination can be evaluated by adding the electricity Ps consumed by the sensing operation device, for example, the electric consumption per hour in the total area to the electricity $\Sigma Pp \cdot Fs$ consumed by the processor that performs the condition determination. In other words, the calculation unit 27c calculates the total evaluation value of the electricity consumption in the sensing operation and the condition determination with the calculation expression "$\Sigma Ps + \Sigma Pp \cdot Fs$".

As described above, the total evaluation value of each of pairs of the combinations of the sensors and the candidate processors is calculated.

Specific Example

Next, a specific example of the sensing operation control according to the present embodiment will be described with reference to FIG. 12 and FIG. 13. FIG. 12 is a diagram of an exemplary operation electricity data 23a. FIG. 13 is a diagram of an exemplary calculation result of the total evaluation value. Note that it is assumed herein that the reception unit 17a receives the conditions for notification illustrated in FIG. 4 from the application program, and the processor data 13a illustrated in FIG. 5A and the frequency data 13b illustrated in FIG. 5B are used for the calculation of the total evaluation value.

For example, when the reception unit 17a receives the request for a BLE sensing operation and an ambulation sensing operation from the application program, the BLE chip 11a and the BLE Chip 21b2 are specified as the sensor that can perform the BLE sensing operation. Furthermore, the ambulation sensor 21b1 is specified as the sensor that can perform the ambulation sensing operation.

As described above, the following combinations (a) and (b) of the sensors can be derived as the combination of the sensors that performs the BLE sensing operation and the ambulation sensing operation.

(a) the combination of the BLE chip 11a+the ambulation sensor 21b1

(b) the combination of the BLE Chip 21b2+the ambulation sensor 21b1

As for the combination of the sensors (a), with reference to the operation electricity data 23a illustrated in FIG. 12, 10 mW is obtained as the operation electricity of the BLE chip 11a and 6 mW is obtained as the operation electricity of the ambulation sensor 21b1. Thus, the evaluation value of the electricity consumption of the combination of the sensors (a) during the BLE sensing operation and the ambulation sensing operation is calculated as 16 mW (=10 mW+6 mW).

As for the combination of the sensors (b), with reference to the operation electricity data 23a illustrated in FIG. 12, 12 mW is obtained as the operation electricity of the BLE Chip 21b2 and 6 mW is obtained as the operation electricity of the ambulation sensor 21b1. Thus, the evaluation value of the electricity consumption of the combination of the sensors (b) during the BLE sensing operation and the ambulation sensing operation is calculated as 18 mW (=12 mW+6 mW).

Herein, the CPU 14 is specified as the destination to which the BLE chip 11a outputs an event and the coprocessor 12b is specified as the destination to which the ambulation sensor 21b1 outputs an event in the combination of the sensors (a). Thus, both of the CPU 14 and the coprocessor 12b are specified as the candidate processors for the offload processor.

(1) The Combination of the Sensors (a)+the Candidate Processor "CPU 14"

When the candidate processor is the CPU 14, the evaluation value of each event is calculated as described above. In other words, similarly to (A1) described in the first embodiment, the evaluation value "22.8" of the electricity consumption of the candidate processor "CPU 14" is calculated by summing the evaluation value "1.5" of the event "detect", the evaluation value "1.5" of the event "lost", the evaluation value "9.9" of the event "start", and the evaluation value "9.9" of the event "stop". After that, the total evaluation value "38.8" as illustrated in FIG. 13 can be calculated by summing the evaluation value "16" of the electricity consumption during the BLE sensing operation and the ambulation sensing operation and the evaluation value "22.8" of the electricity consumption of the candidate processor "CPU 14".

(2) The Combination of the Sensors (a)+the Candidate Processor "Coprocessor 12b"

When the candidate processor is the coprocessor 12b, the evaluation value of each event is calculated as described below. In other words, similarly to (A2) described in the first embodiment, the evaluation value "5.1" of the electricity consumption of the candidate processor "coprocessor 12b" is calculated by summing the evaluation value "1.65" of the event "detect", the evaluation value "1.65" of the event "lost", the evaluation value "0.9" of the event "start", and the evaluation value "0.9" of the event "stop". After that, the total evaluation value "21.1" as illustrated in FIG. 13 can be calculated by summing the evaluation value "16" of the electricity consumption during the BLE sensing operation and the ambulation sensing operation and the evaluation value "5.1" of the candidate processor "coprocessor 12b".

(3) The Combination of the Sensors (b)+the Candidate Processor "Coprocessor 12b"

On the other hand, the coprocessor 12b is specified as the destination to which the BLE Chip 21b2 outputs an event and the coprocessor 12b is also specified as the destination to which the ambulation sensor 21b1 outputs an event in the combination of the sensors (b). Thus, only the coprocessor 12b is specified as the candidate processor for the offload processor. In such a case, the coprocessor 12b can receive all of the events without the intermediation of another processor. The evaluation value "2.1" of the electricity consumption of the candidate processor "coprocessor 12b" is calculated by summing the evaluation value "0.15=0.03×5" of the event "detect", the evaluation value "0.15=0.03×5" of the event "lost", the evaluation value "0.9=0.03×30" of the event "start", and the evaluation value "0.9=0.03×30" of the event "stop". After that, the total evaluation value "20.1" as illustrated in FIG. 13 can be calculated by summing the evaluation value "18" of the electricity consumption during the BLE sensing operation and the ambulation sensing operation and the evaluation value "2.1" of the candidate processor "coprocessor 12b".

(4) The Result of the Selection of the Offload Processor

After the evaluation value of the electricity consumption of the candidate processor of each combination of the sensors is calculated as described above, the pair of the combination of the sensors (b) and the candidate processor "coprocessor 12b" having the smallest evaluation value "20.1" is selected as the offload processor among all of the pairs of the combinations of the sensors and the candidate processors. As described above, the electricity consumed in the sensing operation is added to the electricity consumed in the condition determination, and the electricity is totally evaluated. Then, the offload processor and the sensing operation device are selected in accordance with the total evaluation. The electricity consumption can be reduced more efficiently.

Flow of Process

FIG. 14 is a flowchart of a process for selecting the processor according to the second embodiment. Similarly to the flowchart illustrated in FIG. 7, the process is performed when the reception unit 17a receives a request for a sensing operation from the application program that the application execution unit 16 executes.

As illustrated in FIG. 14, when receiving the request for the sensing operation from the application program (step S501), the reception unit 17a analyzes a source code of the conditions for notification that the reception unit 17a receives together with the request in step S501 (step S502).

Subsequently, the specifying unit 27b derives the combinations of the sensors that are to perform the sensing operation of the request received in step S501 (step S503). After that, the specifying unit 27b selects a combination of the sensors among the combinations of the sensors derived in step S503 (step S504). Then, the specifying unit 27b specifies a device that is to operate in the sensing operation among the combinations of the sensors selected in step S504 (step S505).

After that, the calculation unit 27c calculates the evaluation value of the electricity consumption of the combination of the sensors selected in step S504 by summing the operation electricity of each of the sensing operation devices specified in step S505 with reference to the operation electricity data 23a stored in the storage unit 23 (step S506).

Subsequently, the specifying unit 27b specifies the candidate processors for the offload processor among the processors to which the sensing operation device specified in step S505 outputs an event (step S507).

After that, the calculation unit 27c selects a candidate processor among the candidate processors specified in step S507 (step S508). Subsequently, the calculation unit 27c calculates the evaluation value of the electricity consumed by the candidate processor selected in step S508 during the condition determination, using the frequency of generation of each event analyzed from the conditions for notification in step S502 (step S509).

After that, the calculation unit 27c calculates the total evaluation value from the evaluation value of the electricity consumption of the combination of the sensors calculated in step S506, and the evaluation value of the electricity consumption of the candidate processor calculated in step S509 (step S510).

Subsequently, the processes in steps S508 to S510 are repeated until the total evaluation value of all of the candidate processors specified in step S507 is calculated (step S511: No).

After the total evaluation values of all of the candidate processors specified in step S507 are calculated (step S511: Yes), it is determined whether the total evaluation values of the candidate processors of all of the combinations of the sensors derived in step S503 are calculated (step S512).

The processes in steps S504 to S511 are repeated until the total evaluation values of the candidate processors of all of the combinations of the sensors derived in step S503 are calculated (step S512: No).

After the total evaluation values of the candidate processors of all of the combinations of the sensors derived in step S503 are calculated (step S512: Yes), the selecting unit 17d selects a pair of the combination of the sensors and the candidate processor having the smallest evaluation value among all of pairs of the combinations of the sensors and the candidate processors (step S513).

After that, the selecting unit 17d sets the conditions for notification of the application program in the offload processor selected in step S513, and gives an instruction to perform the sensing operation to the sensor included the combination selected in step S513 (step S514). Then, the process is completed.

Aspect of Effect

As described above, the mobile terminal device 20 according to the present embodiment selects the offload processor in accordance with the frequency of operations of each processor controlled by the mobile terminal device 20 in addition to the evaluation of the electricity consumption, similarly to the mobile terminal device 10 according to the first embodiment. Thus, the mobile terminal device 20 according to the present embodiment can appropriately select, for example, the offload processor.

The mobile terminal device 20 according to the present embodiment further selects the offload processor and the sensing operation device by totally evaluating the offload processor and the sensing operation device with the electricity consumed in the condition determination in addition to the electricity consumed in the sensing operation. Thus, the mobile terminal device 20 according to the present embodiment can efficiently reduce the electricity consumption.

[c] Third Embodiment

The embodiments of the disclosed device have been described above. However, the present invention can be implemented in various embodiments other than the described embodiment. Thus, another embodiment included in the present invention will be described hereinafter.

Use of Sensor Installed on External Device

The examples in which the sensors are installed on the mobile terminal devices 10 and 20 before the shipment of the products have been described in the first and second embodiments. However, the sensor installed on an external device can be used as the sensing operation. For example, a wearable gadget such as a smart glass product, a smart watch, or a ring gadget can be added to the devices controlled by the mobile terminal device 10 or 20 by connecting the wearable gadget to the mobile terminal device 10 or 20 in a wired or wireless communication. In such a case, the mobile terminal device 10 or the mobile terminal device 20 is allowed to perform the process similar to FIGS. 7, 14, and 8 every time the connection of the device such as a wearable gadget or the cancellation of the connection is detected.

Exemplary Application of Frequency Data

The example in which an event is linked to a value of frequency has been described in the first and the second embodiments. However, the range of application is not limited to the embodiments. For example, the mobile terminal device 10 or the mobile terminal device 20 can cause the update unit 17g to generate the frequency data that links an event to a plurality of values of frequency separated by time, or the calculation unit 17c or the calculation unit 27c to calculate the evaluation value with the data. The values of frequency separated by the time when the request is received from the application program are used to calculate the evaluation value as described above. This can improve the accuracy of the calculation of the evaluation value.

First Exemplary Application of Electricity Evaluation Model

The example in which the electricity consumption of the offload processor is evaluated by multiplying the electricity Pp consumed by the processor per condition determination by the frequency Fs of generation of an event of the sensing operation used for the condition determination has been described in the first and the second embodiments. However, the range of application is not limited to the embodiments.

For example, the mobile terminal device 10 or the mobile terminal device 20 finds a probability ΠP (off) of the combination in which the processor does not wake due to any event with a calculation expression "1−frequency×the wake time" that expresses the probability P (off) that the processor does not operate due to each event in the events analyzed from the conditions for notification using the wake time of the processor. After the probability ΠP (off) is found, the probability that the processor operates due to any one of the events is derived with the "1−ΠP (off)". Thus, the frequency Fs' of operation of the processor due to any one of the events can be calculated with the expression "(1−ΠP (off))/the wake time". The frequency Fs' of operation of the processor due to any one of the events is calculated in accordance with the probability "1−ΠP (off)" that the processor operates due to any one of the events as described above. This calculation can prevent the values of the electricity consumption of the overlapping events from redundantly being summed. This prevention can improve the accuracy of the calculation of the evaluation value of the candidate processor.

For example, when the candidate processor is the CPU 14 and the event "detect" and the event "lost" are generated in the conditions for notification illustrated in FIG. 4, the CPU 14 can receive the output from the BLE chip 11a without the intermediation of another processor. On the other hand, when the event "start" and the event "stop" are generated, the CPU 14 receives the output from the ambulation sensor 11b through the coprocessor 12b.

In such a case, the evaluation value Fs'·Pp of the electricity consumed by the CPU 14 in the condition determination can be calculated as "20" with the expression "{1−(1−5×0.002)×(1−5×0.002)×(1−30×0.002)×(1−30×0.002)}×0.3/0.002". The evaluation value Fs'·Pp of the electricity consumed by the coprocessor 12b in the condition determination can be calculated as "1.8" with the expression "{1−(1−30×0.0002)×(1−30×0.0002)}×0.03/0.0002". Thus, the evaluation value ΣFs'·Pp of the electricity consumption when the candidate processor is the CPU 14 can be calculated as 21.8 (=20+1.8). In comparison to this, the evaluation value of the electricity consumption of the candidate processor "CPU 14" is calculated as "22.8" in the first embodiment. This shows that the accuracy of the calculation of the evaluation value of the candidate processor is improved by the difference "1" between the evaluation values of the first and third embodiments.

On the other hand, when the candidate processor is the coprocessor 12b and the event "detect" and the event "lost" are generated in the conditions for notification illustrated in FIG. 4, the coprocessor 12b receives the output from the BLE chip 11a through the CPU 14. On the other hand, when the event "start" and the event "stop" are generated, the coprocessor 12b can receive the output from the ambulation sensor 11b without the intermediation of another processor.

In such a case, the evaluation value Fs'·Pp of the electricity consumed by the CPU 14 in the condition determination can be calculated as "3" with the expression "{1−(1−5×0.002)×(1−5×0.002)}×0.3/0.002". The evaluation value Fs'·Pp of the electricity consumed by the coprocessor 12b in the condition determination can be calculated as "2" with the expression "{1−(1−30×0.0002)×(1−30×0.0002)×(1−5×0.0002)×(1−5×0.0002)}×0.03/0.0002". Thus, the evaluation value ΣFs'·Pp of the electricity consumption when the candidate processor is the CPU 14 can be calculated as 5 (=3+2). In comparison to this, the evaluation value of the electricity consumption of the candidate processor "coprocessor 12b" is calculated as "5.1" in the first embodiment. This shows that the accuracy of the calculation of the evaluation value of the candidate processor is improved by the difference "0.1" between the evaluation values of the first and second embodiments.

Second Exemplary Application of Electricity Evaluation Model

The example in which the evaluation value is calculated on the assumption that the processor operates only when an event is generated has been described in the first and second embodiments. However, the application is not necessarily in accordance with the assumption. For example, the calculation unit 17c or the calculation unit 27c receives the notification indicating the state of wake or sleep of the CPU 14 from the OS operating on the CPU 14 of the mobile terminal device 10 or the mobile terminal device 20. Then, the calculation unit 17c or the calculation unit 27c finds the ratio of the wake time of the CPU 14 to a predetermined period of time or the ratio of the sleep time of the CPU 14 to a predetermined period of time in accordance with the notification. After that, the calculation unit 17c or the calculation unit 27c multiplies the calculated evaluation value by the ratio of the wake time of the CPU 14 to add the operation electricity of the CPU 14 when the processor operates due to a reason other than an event. This can prevent the calculation unit 17c or the calculation unit 27c from redundantly summing the excessive electricity.

Range of Application of Condition Determination

Not only the simple states of the sensing operation illustrated in FIG. 4 but also, for example, a sequence can be used for the condition determination. For example, a check whether the work is systematically done in a factory is cited as an exemplary application. In other words, a BLE beacon is attached to each work place such that the mobile terminal device can detect the BLE beacon. In such a case, a condition "send a notification when the order of the beacons at work places is different while the ambulation stops" can be set as an example. Specifically, the ambulation sensor senses whether the ambulation stops, and the mobile terminal device determines whether the BLE beacons are detected in an order different from the predicted order at the work places sensed by the BLE CHIP in the sensing operation. When both of the conditions are satisfied with "AND", the conditions for notification to be notified to the application program are designated. When such conditions for notification are analyzed, it can be determined that the four events used for the condition determination are the "detect" for the BLE sensing operation, the "lost" for the BLE sensing operation, the "start" for the ambulation sensing operation, and the "stop" for the ambulation sensing operation as the example illustrated in FIG. 4. As described above, the events used for the condition determination can be analyzed regardless of the algorithms for the condition determination, and the evaluation value can be calculated.

Sensing Operation Control Program

Each of the processes described in the embodiments can be performed by the execution of a predetermined program with a computer such as a personal computer or a workstation. Thus, an exemplary computer that executes a sensing operation control program having the same functions as the embodiments will be described hereinafter with reference to FIG. 15.

FIG. 15 is an explanatory diagram of an exemplary computer that executes the sensing operation control program according to the first to third embodiments. As illustrated in FIG. 15, a computer 100 includes a control unit 110a, a loudspeaker 110b, a camera 110c, a display 120, and a communication unit 130. The computer 100 further includes a CPU 150, a ROM 160, an HDD 170, and a RAM 180. The units 110 to 180 are connected to each other through a bus 140.

As illustrated in FIG. 15, the HDD 170 previously stores a sensing operation control program 170a that exerts the same function as the middleware execution unit described in the first and second embodiments. The sensing operation control program 170a can appropriately integrates with or separates from the other components, similarly to each component of each of the functional units illustrated in FIGS. 2 and 10. In other words, each data item stored in the HDD 170 does not have to necessarily be stored in the HDD 170. Only the data used for the process has to be stored in the HDD 170.

The CPU 150 reads the sensing operation control program 170a from the HDD 170 and develops the sensing operation control program 170a to the RAM 180. This makes the sensing operation control program 170a function as a sensing operation control process 180a as illustrated in FIG. 15. The sensing operation control process 180a develops various data items read from the HDD 170 to a region allocated for the sensing operation control process 180a on the RAM 180, and performs various processes in accordance with the developed data. Note that the sensing operation control process 180a includes the processes that the functional units illustrated in FIGS. 2 and 10 perform, for example, the processes illustrated in FIGS. 7 and 8 or FIG. 14. The processing units virtually implemented on the CPU 150 do not have to necessarily operate on the CPU 150. Only the processing units used for the process have to virtually be implemented.

Note that the sensing operation control program 170a does not have to previously be stored in the HDD 170 or the ROM 160. For example, each program is stored in a "portable physical medium", such as a flexible disk, or a FD, a CD-ROM, a DVD disk, a magneto-optical disk, or an IC card, that can be inserted in the computer 100. Then, the computer 100 can obtain each program from such a portable physical medium to execute the program. Alternatively, each program is stored in another computer or server device connected to the computer 100 through a public line, the Internet, a LAN, or a WAN such that the computer 100 can obtain each program and execute the program.

According to the present invention, an offload processor can appropriately be selected.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A sensing operation control method comprising:
receiving, by a processor, a request for a sensing operation from an application program executing on a device;
specifying, by the processor, candidate processors that are to perform condition determination to determine whether an event output from a sensor that performs the sensing operation of the received request satisfies conditions for notification, the conditions being designated by the application program;
calculating, by the processor, an evaluation value of electricity consumed by each of the candidate processors in the condition determination, using frequency of the event of the sensing operation of the received request in frequency data, the frequency data linking an event output from a sensor to frequency determined from a number of times of generation of the event in a predetermined period;
selecting from among the candidate processors, by the processor, a candidate processor having an optimal evaluation value of the electricity consumption as an offload processor; and
executing control operation of the sensor by the selected offload processor.

2. The sensing operation control method according to claim 1, further comprising:
calculating frequency of each of a plurality of events, the frequency being determined from a period between a start and completion of the sensing operation, and the number of times of generation of each of the plurality of events in the period; and
updating the calculated frequency of each of the plurality of events in the frequency data.

3. The sensing operation control method according to claim 1, wherein
the specifying includes specifying combinations of sensors that are to perform the sensing operation of the received request,
the calculating includes calculating, for each of the combinations of sensors that corresponds to the sensing operation, an evaluation value of electricity consumed by the sensors in the sensing operation, and calculating a total evaluation value from the evaluation value of electricity consumed by the sensors in the sensing operation and the evaluation value of electricity consumed by the candidate processor in the condition determination, and
the selecting includes selecting a pair of a combination of sensors and a candidate processor, the pair having an optimal total evaluation value.

4. The sensing operation control method according to claim 1, wherein
when a connection of an external device to a computer or a cancellation of the connection is detected, the specifying includes specifying the candidate processor.

5. The sensing operation control method according to claim 1, wherein
the frequency data links each of a plurality of events output from the sensor to frequency of generation of each of the plurality of events within the predetermined period of time.

6. A mobile terminal device comprising:
a processor that executes a process comprising:
receiving a request for a sensing operation from an application program executing on a device;
specifying candidate processors that are to perform condition determination to determine whether an event output from a sensor performing the sensing operation of the received request satisfies conditions for notification, the conditions being designated by the application program;
calculating an evaluation value of electricity consumed by each of the candidate processors in the condition determination, using frequency of the event of the sensing operation of the received request in frequency data, the frequency data linking an event output from a sensor to frequency determined from a number of times of generation of the event in a predetermined period;
selecting, from among the candidate processors, a candidate processor having an optimal evaluation value of the electricity consumption as an offload processor; and
executing control operation of the sensor by the selected offload processor.

* * * * *